US010260938B2

(12) United States Patent
Park et al.

(10) Patent No.: US 10,260,938 B2
(45) Date of Patent: Apr. 16, 2019

(54) FOREIGN SUBSTANCE PREVENTION APPARATUS

(71) Applicant: HANWHA LAND SYSTEMS CO., LTD., Changwon-si (KR)

(72) Inventors: Jin Seok Park, Changwon-si (KR); Seung Park, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 0 days.

(21) Appl. No.: 15/322,181

(22) PCT Filed: Dec. 4, 2014

(86) PCT No.: PCT/KR2014/011801
§ 371 (c)(1),
(2) Date: Dec. 27, 2016

(87) PCT Pub. No.: WO2015/199294
PCT Pub. Date: Dec. 30, 2015

(65) Prior Publication Data
US 2017/0131139 A1    May 11, 2017

(30) Foreign Application Priority Data

Jun. 27, 2014    (KR) .................. 10-2014-0079984

(51) Int. Cl.
*G01J 1/02*     (2006.01)
*G01D 11/24*    (2006.01)
(Continued)

(52) U.S. Cl.
CPC .......... *G01J 1/0252* (2013.01); *G01D 11/245* (2013.01); *G01J 1/42* (2013.01); *G02B 27/0006* (2013.01); *G01S 7/4813* (2013.01)

(58) Field of Classification Search
CPC ..................................................... G01J 1/0252
See application file for complete search history.

(56) References Cited

U.S. PATENT DOCUMENTS

| 4,004,431 A | * | 1/1977 | Hildreth | ............. | F04B 49/10 |
| | | | | | 62/193 |
| 5,693,248 A | * | 12/1997 | Kim | ............. | H05B 6/642 |
| | | | | | 219/707 |

(Continued)

FOREIGN PATENT DOCUMENTS

| KR | 20-0174572 Y1 | 3/2000 |
| KR | 10-0398534 B1 | 9/2003 |

(Continued)

OTHER PUBLICATIONS

Search Report dated Mar. 31, 2015 issued by the International Searching Authority in counterpart International Patent Application No. PCT/KR2014/011801 (PCT/ISA/210).

*Primary Examiner* — Thanh Luu
(74) *Attorney, Agent, or Firm* — Sughrue Mion, PLLC

(57) ABSTRACT

A foreign substance prevention apparatus according to an embodiment of the present invention may comprise: a housing including a suction port which is a passage for sucking external air, and a discharge port for discharging the sucked external air; a fan which exists inside the housing and rotates so as to suck the external air; and a connection bracket for connecting the housing and a sensor.

6 Claims, 3 Drawing Sheets

(51) Int. Cl.
*G01J 1/42* (2006.01)
*G02B 27/00* (2006.01)
*G01S 7/481* (2006.01)

(56) References Cited

U.S. PATENT DOCUMENTS

| | | | | |
|---|---|---|---|---|
| 6,132,084 | A * | 10/2000 | Whipple, III | G01J 5/041 219/711 |
| 6,646,560 | B1 | 11/2003 | Krasenics, Jr. | |
| 2011/0308265 | A1 * | 12/2011 | Phannavong | F24F 12/001 62/160 |
| 2012/0118279 | A1 * | 5/2012 | Asami | F24C 15/2007 126/20 |

FOREIGN PATENT DOCUMENTS

| KR | 10-2009-0022505 A | 3/2009 |
|---|---|---|
| KR | 10-2011-0040356 A | 4/2011 |

\* cited by examiner

FOREIGN SUBSTANCE PREVENTION APPARATUS

TECHNICAL FIELD

The present invention relates to a foreign substance prevention apparatus.

BACKGROUND ART

When using a sensor in an outdoor environment of rain, snow, wind, or the like, there occurs a case of various foreign substances, such as rain, snow, and leaves, adhering to the sensor.

When foreign substances adhere to the sensor, due to the diffuse reflection by foreign substances, the use of the sensor is difficult, and the accuracy of the sensor is reduced.

DISCLOSURE

Technical Problem

Accordingly, there is a need to prevent a situation in which foreign substances adhere to a sensor, such as a situation of bad weather.

The technical problem to be solved by an aspect of the present invention is to provide a foreign substance prevention apparatus, which can remove various foreign substances, such as rain, snow, dew, and leaves, adhering to a sensor by using air, or which can prevent various foreign substances from adhering to the sensor.

Additional advantages, subjects, and features of the invention will be set forth in part in the description which follows and in part will become apparent to those having ordinary skill in the art upon examination of the following or may be learned from practice of the invention.

Technical Solution

According to an aspect of an embodiment, there is provided a foreign substance prevention apparatus, comprising: a housing including a suction port, which is a suction passage of external air, and a discharge port, through which sucked air is discharged; a fan provided in the housing and rotating to suck the external air; and a connection bracket connecting the housing with a sensor.

The sensor is a laser sensor including a light-receiving portion and a light-emitting portion, and at least a part of the air sucked through the suction port is discharged toward the light-receiving portion and the light-emitting portion.

The housing includes an upper surface portion and a lower surface portion, and the suction port is provided at a lower end of the housing.

The discharge port is provided at the lower end of the housing.

The housing includes a lower surface portion and an inner wall extending from the lower surface portion, and the height of the inner wall is equal to or higher than the height from the lower surface portion to the fan.

According to an aspect of an embodiment, there is provided a foreign substance prevention apparatus, further comprising: a measurement sensor measuring at least any one of rainfall, snowfall, and air volume; and a control unit automatically rotating the fan when the amount obtained by measuring at least any one of rainfall, snowfall, and air volume using the measurement sensor is equal to or more than a preset amount.

Advantageous Effects

According to an aspect of the present invention, it is possible to remove various foreign substances, such as rain, snow, dew, and leaves, adhering to a sensor, or to prevent various foreign substances from adhering to the sensor.

The effects of the present invention are not limited to the above-described effects, and other unmentioned effects will be clearly understood to those skilled in the art from the description of claims.

BEST MODE FOR INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

If a component is expressed as "linked" or "connected" to other component, a component should be understood as that it may be not only directly linked or connected to other component, but also indirectly linked or connected. On the other hand, if a component is expressed as "directly linked" or "directly connected" to other component, it should be understood that there is no component between these two components.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Although the present invention may be applied to a sensor operating in an indoor environment, it may be particularly usefully applied to a sensor operating in an outdoor environment. Specifically, for example, the present invention may be particularly usefully applied in an outdoor environment where foreign substances frequently adhere to the surface of a sensor, such as a rainy outdoor environment, a snowy outdoor environment, or an outdoor environment where foreign substances, such as leaves, are flying due to the wind. However, the present invention may also be usefully applied even in an indoor environment, not in an outdoor environment, when a phenomenon of foreign substances adhering to a sensor occurs.

Hereinafter, a foreign substance prevention apparatus according to an embodiment of the present invention will be described with reference to FIGS. 1 to 4.

Figure 1:
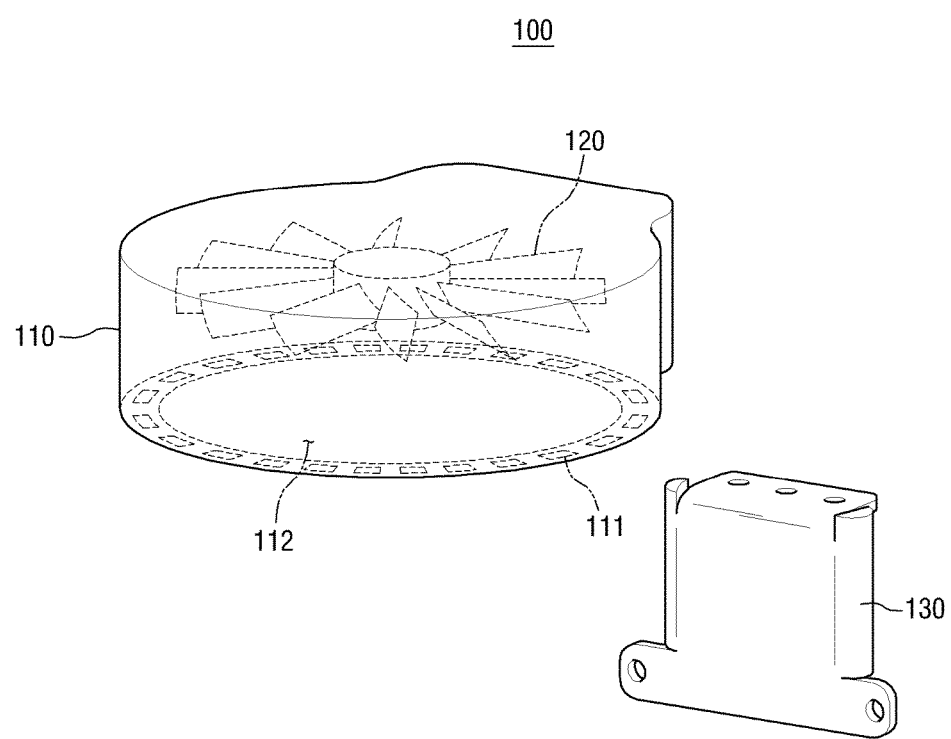
FIG. 1 is a perspective view showing a configuration of a foreign substance prevention apparatus according to an embodiment of the present invention.

FIG. 1 is a perspective view showing a configuration of a foreign substance prevention apparatus according to an embodiment of the present invention.

Referring to FIG. 1, the foreign substance prevention apparatus according to an embodiment of the present invention may include a housing 110, a fan 120, and a connection bracket 130.

The housing 110 may include a suction port 111 and a discharge port 112.

The suction port 111 may be a region where air is sucked, and the discharge port 112 may be a region where air is discharged.

The housing 110 may be hermetically sealed such that air cannot be sucked or discharged except for the suction port 111 and the discharge port 112. In FIG. 1, the housing is only shown in a semi-transparent form in order to illustrate the presence of the fan 120 in the housing, and the housing 110 may be hermetically sealed except for the suction port 111 and the discharge port 112.

The fan 120 is provided in the housing 110, and rotates to suck air from the outside of the housing 110.

When the fan 120 rotates, air is sucked from the outside of the housing 110 through the suction port 110, and the sucked air is discharged through the discharge port 112.

The connection bracket 130 connects the housing 110 with a sensor.

Figure 2:
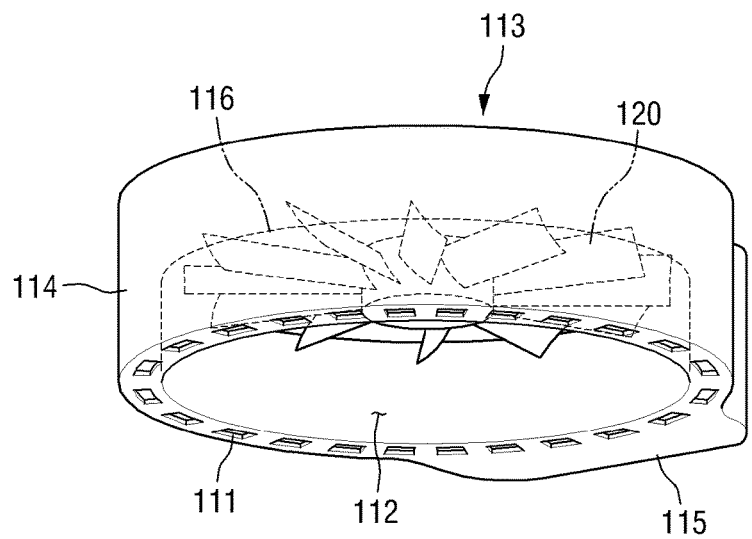
FIG. 2 is a perspective view showing an example of a housing in the foreign substance prevention apparatus according to an embodiment of the present invention.

FIG. 2 is a perspective view showing an example of the housing 110 in the foreign substance prevention apparatus according to an embodiment of the present invention.

Specifically, the housing 110 includes an upper surface portion 113 located at the upper end of the housing 110, a lower surface portion 115 located at the lower end thereof, and a lateral surface portion 114 integrally connected with the upper and lower ends thereof.

The suction port 111 may exist in at least one region of the upper surface portion 113, the lateral surface portion 114, and the lower surface portion 115. However, the suction port 111 may exist in the lower surface portion 115 in order to prevent rain, snow, and/or various foreign substances from be sucked through the suction port 111 in an outdoor environment of rain, snow and/or wind.

As shown in FIG. 2, the suction port 111 may exist in the form of a plurality of holes along the periphery of the lower surface portion 115. However, the suction port 111 has not necessarily such a form, and may exist in the form of a tubular single hole along the periphery of the lower surface portion 115. That is, the form of the suction port 111 is not limited, and may be a form capable of performing a function of sucking air from outside.

The discharge port 112 refers to a region for discharging the air sucked through the suction port 111.

The discharge port 112, similarly to the suction port 111, may exist in at least one region of the upper surface portion 113, the lateral surface portion 114, and the lower surface portion 115. However, preferably, the discharge port 112 exists such that the sucked air is discharged toward a sensor in order to prevent foreign substances from adhering to the sensor or to remove the foreign substances adhered to the sensor.

That is, the discharge port 112 may refer to an opening formed in a portion of the housing 110 including the lower surface portion 115.

For example, when the foreign substance prevention apparatus according to an embodiment of the present invention is connected with a sensor such that this foreign substance prevention apparatus is located at the upper end of the sensor, the discharge port 112 exists in the lower surface portion 115 of the housing 110.

More specifically, for example, the sensor may be a laser sensor including a light-receiving portion and a light-emitting portion. The air sucked through the suction port 111 may be discharged toward the light-receiving portion and the light-emitting portion. The air discharged toward the light-receiving portion and light-emitting portion of the laser sensor acts as an air curtain to prevent foreign substances (rain, snow, leaves, etc.) from adhering to the light-receiving portion and the light-emitting portion and to remove the foreign substances adhered to the light-receiving portion and the light-emitting portion. Thus, it is possible to prevent the measurement accuracy of the laser sensor from being reduced due to foreign substances.

As described above, the housing 110 may be hermetically sealed such that external air is not introduced except for the suction port 111 and the discharge port 112. The housing 110 is hermetically sealed such that external air is not introduced except for the suction port 111 and the discharge port 112, thereby preventing snow, rain and/or various foreign substances from being introduced into the housing 110 in an outdoor environment of rain, snow and/or wind. Further, external air is sucked through only the suction port 111, and the sucked air is discharged through only the discharge port 112, thereby controlling the flow of air according to the function of removing the foreign substances adhered to the sensor and/or preventing the foreign substances from adhering to the sensor.

The housing 110 may include an inner wall 116 in order to suck external air through only the suction port 111 and discharge the sucked air through only the discharge port 112 when the fan rotates.

The inner wall 116 may be formed to extend from the lower surface portion 115 of the housing 110. Specifically, the inner wall 116 may be formed to extend in the vicinity of the boundary between the lower surface portion 115 and opening (discharge port 112 ) of the housing 110.

The inner wall 116 is configured such that, when external air is sucked through the suction port 111 by the rotation of the fan 120, the sucked air is introduced into a region between the fan 120 and the upper surface portion 113, and the introduced air passes through the rotating fan 120 and is then discharged through the discharge port 112. That is, the inner wall 116 may be configured in the form of surrounding the periphery of the region between the lower surface portion 115 and the fan 120 in order to prevent the sucked external air from being directly discharged through the discharge port 112 without being introduced between the region between the fan 120 and the upper surface portion 113 and to prevent the flow of air in the housing 110 from being irregular.

The inner wall is physically connected with the housing 110, but may not be connected with the fan 120. The height of the inner wall 116 may be equal to or slightly higher than the height from the lower surface portion 115 to the fan 120.

When the housing 110 further includes the inner wall 116, it is possible to more easily control the flow of air in a desired direction up to the process of discharging the air sucked from the outside. Further, when the housing 110 further includes the inner wall 116, all (most) of the sucked air passes through the rotating fan 120 and is then discharged, and thus the speed of the discharged air after passing through the fan 120 is faster than the speed of the discharged air without passing through the fan 120. Therefore, it is possible to more effectively prevent foreign substances from adhering to the sensor or more effectively remove the adhered foreign substances.

Figure 3:
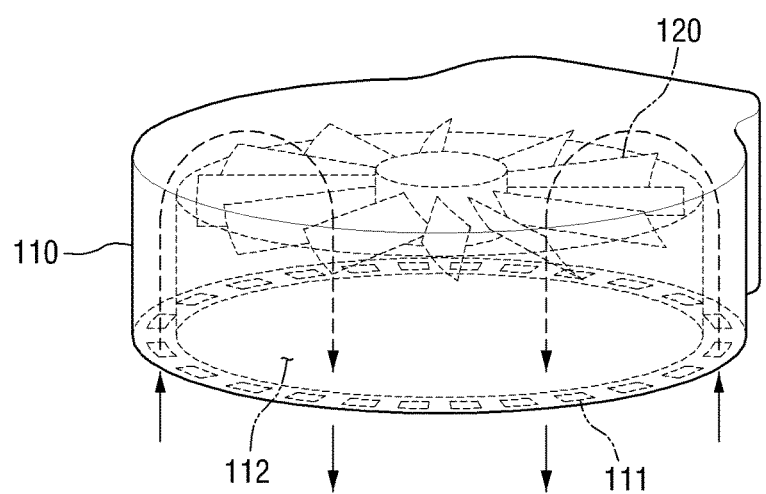
FIG. 3 is a perspective view showing an example of air flow formed by the foreign substance prevention apparatus according to an embodiment of the present invention.

FIG. 3 is a perspective view showing an example of the air flow formed by the foreign substance prevention apparatus according to an embodiment of the present invention.

Referring to FIG. 3, as described above, when the fan 120 rotates, external air is sucked into the housing 110 through the suction port 111. The sucked air moves to the upper end of the rotating fan 120 because it cannot move to the lower end of the rotating fan 120 due to the inner wall 116.

The air moved to the upper end of the fan 120 passes through the fan 120 by the rotation of the fan 120, and is then discharged through the discharge port 112 located at the lower end of the fan 120.

The air discharged through the discharge port 112 is applied toward a sensor to prevent foreign substances from adhering to the sensor or remove the foreign substances adhered to the sensor.

The foreign substances that can easily adhere to the sensor may be windy soil or water drops. Therefore, the air discharged through the discharge port 112 may be used to such a degree that it is possible to prevent soil or water drops from adhering to the sensor.

Figure 4:
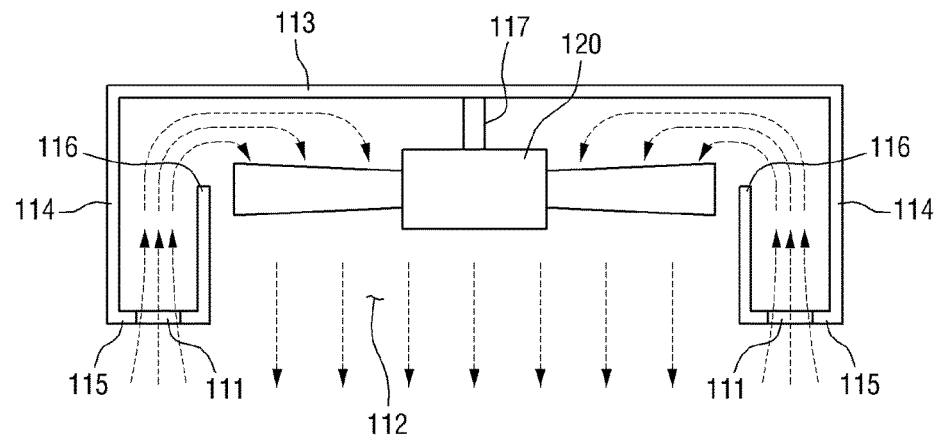
FIG. 4 is a sectional view of the foreign substance prevention apparatus according to an embodiment of the present invention.

FIG. 4 is a sectional view of the foreign substance prevention apparatus according to an embodiment of the present invention.

Referring to FIG. 4, the suction port 111, the opening-shaped discharge port 112, the upper surface portion 113, the lateral surface portion 114, the lower surface portion 115, and the inner wall 116, which are included in the housing 110, are shown.

The fan 120 may be provided in the housing 110, and may be connected with the housing 110. As shown in FIG. 4, the connection type of the fan 120 and the housing 110 may be configured such that a portion 117 extending from the upper surface portion of the housing 110 is attached and connected to the central portion of the upper surface of the fan 120. The connection type of the fan 120 and the housing 110 is not limited to that shown in FIG. 4, and all connection types may be used as long as the fan 120 can rotate and the overall flow of air is not greatly hindered.

Explaining the overall flow of air with reference to FIG. 4, as described with reference to FIGS. 1 to 3, when the fan 120 rotates, external air is sucked into the housing 110 through the suction port 111 (external air is more rapidly sucked compared to when the fan 120 does not rotate), and the sucked air is discharged through the discharge port 112.

Figure 5:
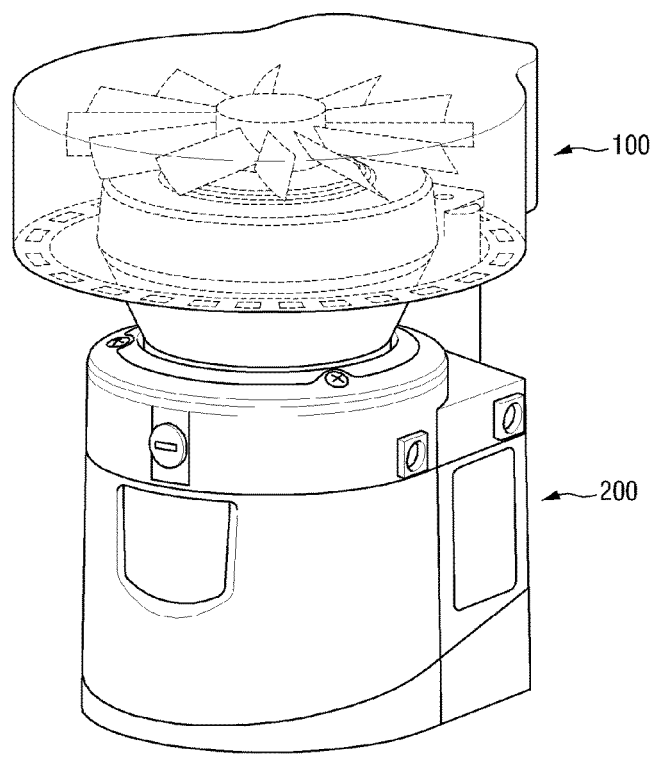
FIG. 5 is a perspective view showing an example in which the foreign substance prevention apparatus according to an embodiment of the present invention is mounted on a sensor.

FIG. 5 is a perspective view showing an example in which the foreign substance prevention apparatus according to an embodiment of the present invention is mounted on a sensor.

The foreign substance prevention apparatus according to an embodiment of the present invention, as shown in FIG. 5, may be connected with a sensor 200. It is preferred that the foreign substance prevention apparatus according to an embodiment of the present invention is provided with the suction port 111 and the discharge port 112 at the lower surface portion of the housing 110 in order to prevent the inflow of foreign substances. Therefore, the foreign substance prevention apparatus according to an embodiment of the present invention, as shown in FIG. 5, may be mounted to be located at the upper end of the sensor 200.

The housing 110 is connected with the sensor 200 by the connection bracket 130. In this case, since the discharge port 112 is located at the upper end of the sensor 200, the air discharged through the discharge port 112 acts as an air curtain toward the sensor 200, so as to prevent foreign substances from adhering to the sensor and remove the foreign substances adhered to the sensor 200.

The foreign substance prevention apparatus according to an embodiment of the present invention may further include a measurement sensor (not shown) for measuring at least any one of rainfall, snowfall, and air volume.

Further, the foreign substance prevention apparatus according to an embodiment of the present invention may further include a control unit (not shown) for automatically rotating the fan 120 when the amount obtained by measuring at least any one of rainfall, snowfall, and air volume using the measurement sensor (not shown) is equal to or more than the preset amount.

Further, the foreign substance prevention apparatus according to an embodiment of the present invention may further include a curtain-type cover or hood at the upper surface portion 113 of the housing 110. The curtain-type cover or hood may be made of a light material, such as cloth. The control unit (not shown) can temporarily lower the curtain-type cover or hood to prevent foreign substances from adhering to the sensor 200 when it is determined that there is a possibility that foreign substances that cannot be blocked by the air curtain adhere to the sensor 200.

Whether there is a possibility that foreign substances that cannot be blocked by the air curtain adhere to the sensor 200 may be determined by using information collected from sensors existing in a vehicle provided with the sensor 200. For example, when it is determined by using the information collected from sensors existing in the vehicle that a water sump exists in the entry direction of the vehicle, the control unit (not shown) may lower the curtain-type cover or hood for a preset time. The preset time may be set differently depending on the speed of the vehicle.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

[Description of references]

| | |
|---|---|
| 100: Foreign substance prevention apparatus according to an embodiment | |
| 110: housing | |
| 111: suction port | 112: discharge port |
| 113: upper surface portion | 114: lateral surface portion |

| [Description of references] | |
|---|---|
| 115: lower surface portion | 116: inner wall |
| 117: portion extending from the upper surface portion | |
| 120: fan | 130: connection bracket |
| 200: sensor | |

The invention claimed is:

1. A foreign substance prevention apparatus, comprising:
a housing including a suction port, which is a suction passage of external air, and a discharge port, through which sucked air is discharged;
a fan provided in the housing and rotating to suck the external air;
a connection bracket connecting the housing with a sensor,
wherein the housing includes a lower surface portion and a lateral surface portion, and
wherein an inner wall extends from the lower surface portion and is set apart from the lateral surface portion, and wherein the suction port is located between the inner wall and the lateral surface portion.

2. The foreign substance prevention apparatus of claim 1, wherein the sensor includes a laser, and
at least a part of the air sucked through the suction port is discharged toward the periphery of the sensor.

3. The foreign substance prevention apparatus of claim 1, wherein the housing includes an upper surface portion, and the suction port is provided at a lower end of the housing.

4. The foreign substance prevention apparatus of claim 3, wherein the discharge port is provided at the lower end of the housing.

5. The foreign substance prevention apparatus of claim 1, wherein a height of the inner wall is equal to or higher than a height from the lower surface portion to the fan.

6. The foreign substance prevention apparatus of claim 1, further comprising:
a control unit automatically rotating the fan when the amount obtained by measuring at least any one of rainfall, snowfall, and air volume is equal to or more than a preset amount.

* * * * *